Dec. 20, 1949     L. L. HAZEN     2,491,464
SHEAVE
Filed Sept. 11, 1946
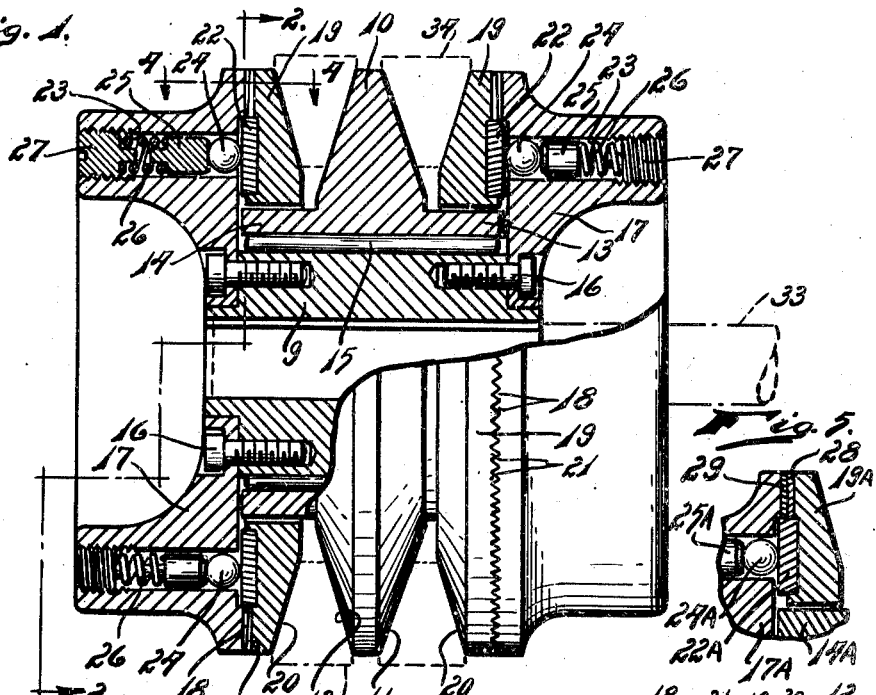
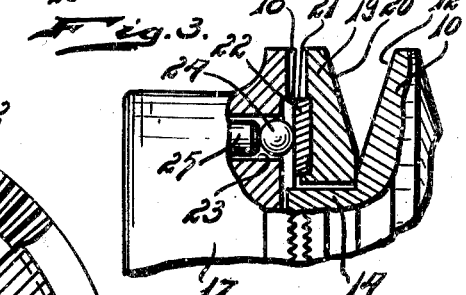
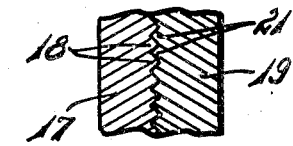
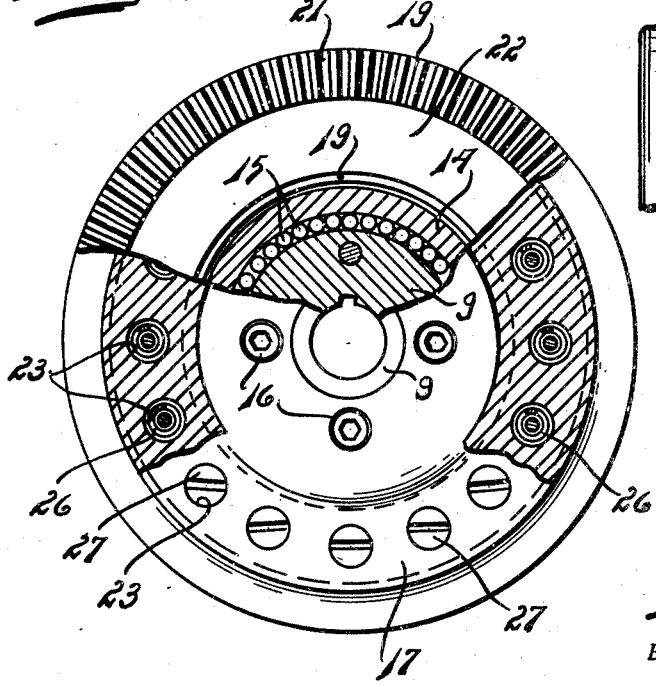
INVENTOR.
LYSLE L. HAZEN
BY
ATTORNEY Patented Dec. 20, 1949

2,491,464

UNITED STATES PATENT OFFICE 2,491,464

SHEAVE

Lysle L. Hazen, Detroit, Mich., assignor to Enterprise Machine Parts Corp., Detroit, Mich., a corporation of Michigan Application September 11, 1946, Serial No. 696,097

1 Claim. (Cl. 74—230.17)

My invention relates to a new and useful improvement in a sheave adapted for driving a shaft and adapted, itself, for being driven by a suitable belt. It is an object of the present invention to provide a device of this class whereby there will be provided a free running sheave when the belt is loosened and a clutch driven sheave when the belt is tight.

Another object of the invention is the provision of a sheave so arranged and constructed that it will run idle when the belt is loosened and operate for driving purposes when the belt is tight.

Another object of the invention is the provision of a sheave of this class which may be adapted for use with any desired number of belts.

Another object of the invention is the provision of a sheave so arranged and constructed that it may be set at a predetermined load for operative purposes and when this load is exceeded, the clutch will automatically slip permitting the sheave to run idle thus providing a safety factor both for the driving and driven parts.

Another object of the invention is the provision of a sheave of this class which may be compact, durable, economically manufactured and highly efficient in use.

It is recognized that various modifications and changes may be made in the detail of structure illustrated without departing from the invention itself and it is intended that such shall be embraced within the scope of the claim which forms a part hereof.

Forming a part of this specification are drawings in which,

Fig. 1, is a central vertical sectional view of the invention with parts broken away and parts shown in side elevation, Fig. 2, is a view taken on line 2—2 of Fig. 1, with parts broken away, Fig. 3, is a fragmentary sectional view similar to Fig. 1, showing the parts in a different position, Fig. 4, is a fragmentary sectional view taken on line 4—4 of Fig. 1, Fig. 5, is a fragmentary sectional view showing a slight modification.

In the drawings I have illustrated the invention comprising a hub 9 which is fixedly mounted on the shaft 33. This shaft 33 may be either the driven shaft or the driving shaft depending upon whether the sheave is to transmit power from or to the shaft 33. Embracing and spaced from the member 9 by means of the roller bearings 15, is an annular member or sheave comprising the central portion 10 and the lateral projections 13 and 14 so that the structure may be said to involve an annular member having an outwardly projecting central circumferentially extending rib. This central portion 10 is provided with the beveled faces 11 and 12. Secured to opposite sides of the hub 9, by means of the screws 16, is an annular member or clutch plate 17 having teeth 18 formed on its inner face adjacent its perimeter which are adapted to mesh with the teeth 21 formed on the outer face of the ring or clutch plate 19 which embraces the laterally projecting portions 13 or 14 as the case may be. This member 19 is provided with a beveled face 20 to cooperate with the face 11 in engaging the V-belt 34. Secured to the outer face of the ring 19 is a wear plate 22 which is adapted to engage the ball 24 positioned in the passage 23 formed in the member 17. This ball 24 is normally pressed against the face of the wear plate 22 by means of the plunger 25 which is pressed by the spring 26, one end of this spring 26 bearing against the plug 27 which is used to close the outer end of the passage 23.

The construction is such that when the V-belt 34 is loosened and moves outwardly of the V-groove between the faces 20 and 11, the member 19 will move inwardly, that is, to the left of Fig. 1, or to the right of Fig. 1, depending upon which side is being considered. When this member 19 moves inwardly the teeth 21 will move out of mesh with the teeth 18 and the sheave which engages the belt will then ride free. When the belt is tightened and the V-belt moves inwardly in the V-groove, the side face of the belt will force the member 19 outwardly until the teeth 21 and 18 again engage. Thus, there is provided a structure in which there is a free running sheave when the V-belts are loosened and a clutch driven sheave when the belts are tight. Experience has shown that this structure is especially applicable where space is limited for the installation of various types of clutches on which a sheave is frequently mounted. The simplicity of the structure also lends itself to installations where streamlining is important. It will also be noted that the structure will operate whether the drive is clockwise or counterclockwise.

In Fig. 5, I have shown a slight modification in which the member 19a, corresponding to the member 19 of Fig. 1, is provided with the wear plate 22a engaging the ball 24a which is pressed by the plunger 25a. On the part 17a adjacent its perimeter on the face which opposes the member 19a instead of teeth 21, I provide a friction pad 29. Similarly on the opposed face of the part 19a adjacent its perimeter, instead of the teeth 18 I provide a friction pad 28. The operation is the same except instead of having teeth mesh the pads 28 and 29 will engage each other and the driving be through this friction clutch. An advantage of this structure is that when the tension of the spring 26 is adjusted, which may be effected by threading inwardly or outwardly the screw 27, the friction pads 29 and 28 in engagement with each other will serve to drive a predetermined load. When this load is exceeded there will be a slipping so that there is thus provided a safety factor both for the driving mechanism and the mechanism which is being driven.

It is believed obvious that while I have shown the structure adapted for use with a pair of belts, any desired number of belts may be used by increasing the number of units or decreasing the structure until a single belt is used.

What I claim as new is:

A device of the class described, comprising a shaft; a hub fixedly mounted on said shaft; an annular member rotatably mounted on said hub; a belt engaging portion on said annular member for engaging one side of a belt; a clutch plate positioned about and rotatable in unison with said shaft; a slidable clutch plate embracing said annular member and adapted for engaging another side of a belt and axially moveable in response to pressure on the side of the belt engaged into cooperative relationship with said first named clutch plate for rotation in unison therewith, said slidable clutch plate being freely rotatable about said shaft and moved out of cooperative relationship with said first named clutch plate upon withdrawal therefrom; teeth formed on the opposed faces of said clutch plates and adapted for interengaging upon movement of the same in cooperative relationship to each other; an annular wear plate on the face of said slidable clutch plate; a ball carried by said first named clutch plate and engageable with said wear plate; spring means for pressing said ball against said wear plate and urging said slidable clutch plate out of engagement with said first named clutch plate.

LYSLE L. HAZEN.

REFERENCES CITED

The following references are of record in the file of this patent:

UNITED STATES PATENTS

| Number | Name | Date |
|---|---|---|
| 1,683,374 | White | Sept. 4, 1928 |
| 2,175,830 | Davis | Oct. 10, 1939 |
| 2,254,592 | Berkeley | Sept. 2, 1941 |

FOREIGN PATENTS

| Number | Country | Date |
|---|---|---|
| 298,741 | Germany | June 23, 1917 |